Figure 3:
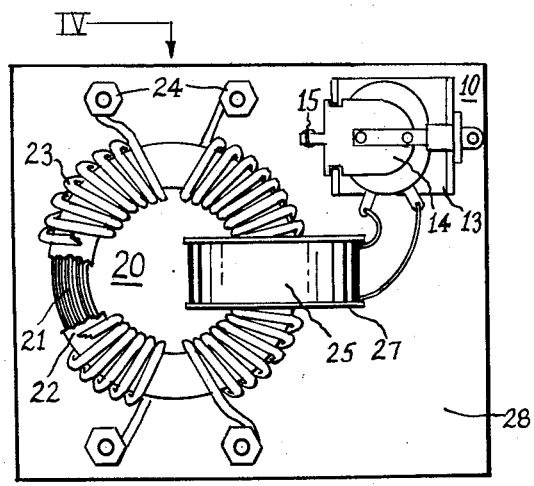

Jan. 12, 1960 W. E. McFARLAND 2,921,241
CURRENT ACTUATED SENSING APPARATUS
Filed June 7, 1957 2 Sheets-Sheet 1

WILLIAM E McFARLAND
INVENTOR.

BY
Attorney

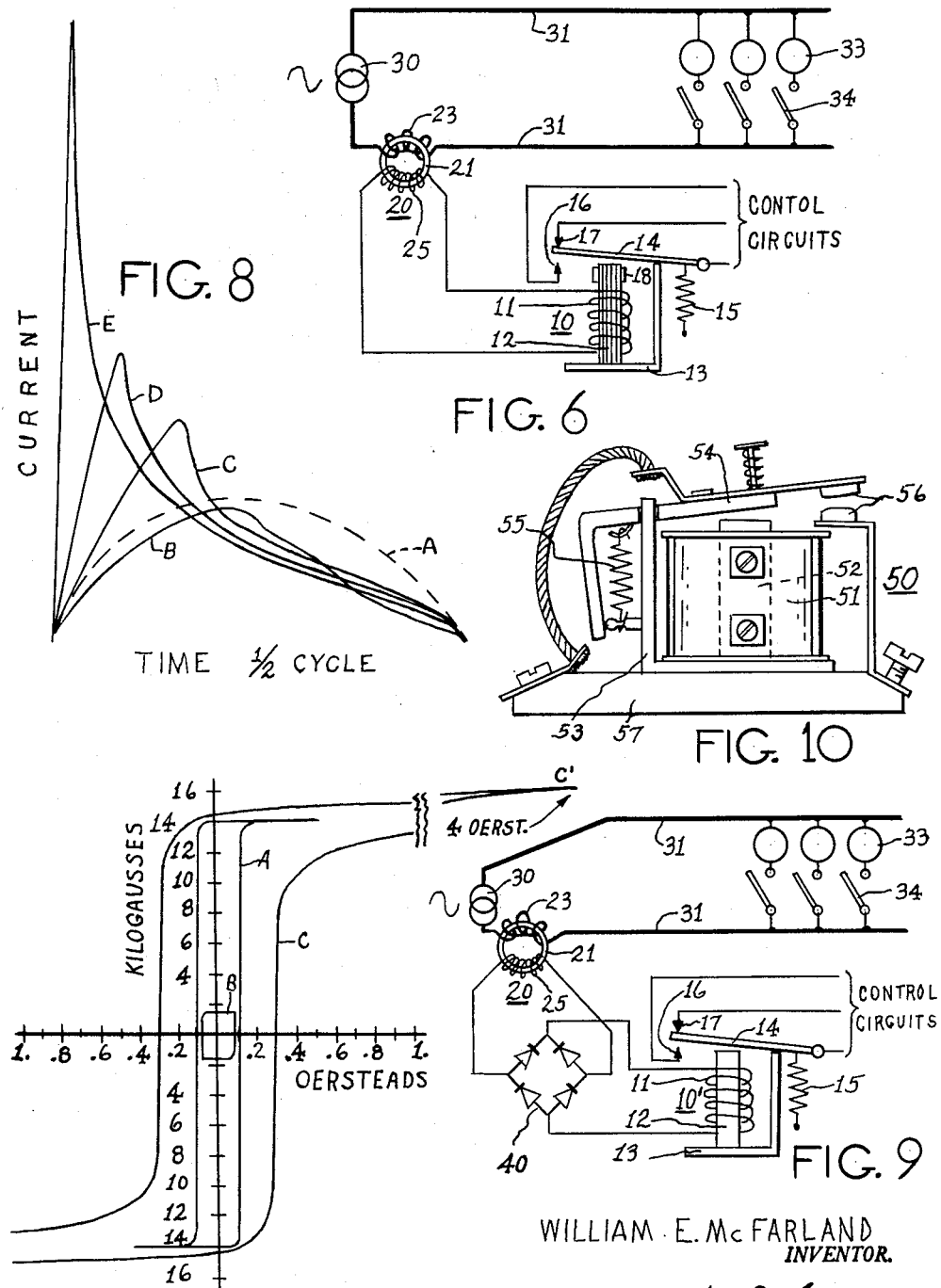

United States Patent Office 2,921,241
Patented Jan. 12, 1960

2,921,241
CURRENT ACTUATED SENSING APPARATUS
William E. McFarland, Nutley, N.J.
Application June 7, 1957, Serial No. 664,322
7 Claims. (Cl. 317—148)

This invention relates to current-actuated sensing apparatus adapted to provide a sensitive off-on type of control or indicating function and one responsive to current flow or non-flow through use or non-use of ordinary light or power circuits of, say, 10 to 100 amperes or higher capacity. More particularly, the invention relates to apparatus comprising a current transformer and electromagnetic switching relay efficiently energized by the transformer independently of the degree of power flow.

A relay alone may provide response in a power circuit, and may be fully adequate where there is no appreciable requirement for sensitive response. But, it is well-known that the sensitive types of directly-energized current-actuated relays are expensive and unsatisfactory as to consistent operation. It is also well-known that there is significant advantage in the use of a combination of a transformer and relay, as compared to a relay alone, provided that the transformer design is such that the core reaches a high level of magnetization in the lower range of power circuit current flow, so that the transformer output is limited in the upper range of power circuit flow. In the prior art, however, transformers used for this purpose have had to be large with respect to the number of primary winding turns or core sectional area, or both, which results in a very noticeable detrimental effect on the voltage regulation of the power circuit. Special expedients, such as using a transformer of specifically high reactance design, have been employed, but even so, overheating of the transformer and relay have not been avoided. As a result, control applications up to the present time have generally involved a compromise between inferior results and highly elaborate apparatus.

The principal object of the present invention is to provide a current-actuated apparatus avoiding these prior art difficulties, and employing a very small and practical transformer in conjunction with only a conventional low cost relay and providing, in a very simple manner, even more sensitive response than obtained heretofore. The small transformer employed herein uses a gapless core of high quality material exhibiting its best characteristics at or very near its saturation level. Specifically, the core must be a tape-wound core of grain-oriented metal, or its equivalent. Design values of the combination herein are those which assure magnetization of the transformer core to its saturation level even under the condition of minimum load current flow that could be capable of providing a relay response. Another object of the present invention is to provide a uniform and level energization of the relay as to operative switching quality and to avoid excessive coil heat independently of the variation of the load current flow. A further object is to provide a current-actuated sensing apparatus comprising a transformer and switching relay, in which the novel elements and design values assure that the transformer output inherently is held within limits permitting most efficient rectification of the transformer current and paticularly permitting large capacity switching relays to be energized directly without use of pilot relays.

Figure 1:
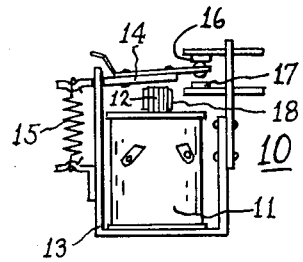
Figure 4:
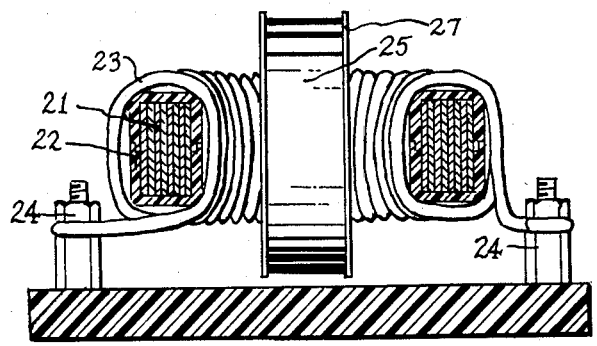
Figure 2:
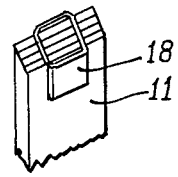
Figure 5:
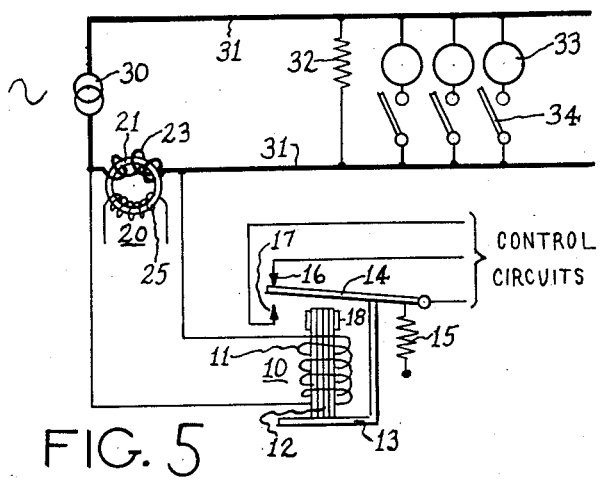

The invention will be more readily understood by reference to the accompanying drawings in which Figure 1 depicts a side view of a relay suitable for use in the present invention. Figure 2 presents a perspective view of a portion of the shading coil in the relay of Figure 1. A top or plan view of a transformer-relay combination, suitable for use in the present invention, is shown in Figure 3. A cross-sectional side view along IV—IV of Figure 3 is illustrated in Figure 4. A circuit diagram showing an autotransformer arrangement and relay combination for operating a control circuit in response to use or non-use of a load circuit is depicted in Figure 5. Figure 6 shows a similar circuit employing a more conventional transformer arrangement. Figure 7 shows permeability qualities relevant to transformer cores utilized in the present invention, while Figure 8 illustrates secondary current values plotted with respect to time when various primary currents are applied to the transformers of the present invention. Figure 9 is another circuit of the type of Figure 6 but employing a metallic rectifier connected between the transformer secondary and the relay. A side view of a larger relay suitable for some of the purposes of the invention is presented in Figure 10. Similar numerals refer to similar parts in the various figures.

The sensing apparatus of the present invention is useful only for providing an off-on type of function such as where the relay must pull-in or hold-in respective to some certain fractional power circuit current flow representing a normal flow in the system considered in the respect that the control function must be obtained at that value, yet it is quate a small flow relative to the maximum sustained flow of the system. There frequently is, or there can be provided, a slight residual flow, such as a leakage current in the power circuit, which would not be considered a significant flow for the control purposes herein, and which, alone, is expected not to cause operation of the control function. For simplicity, the power circuit current will be often referred to as the "primary current," and reference to minimum and maximum primary current will refer to the point of minimum response and point of maximum capacity, respectively, of the sensing apparatus rather than referring to maximums and minimums in actual use in a specific power circuit, since it often may be fortuitous that the sensing apparatus exceeds the aforesaid rating and sensitivity requirements of the power circuit.

The term "one unit of primary current" will be used at times hereafter to designate the minimum primary current and is intended to indicate approximately the minimum current which will result in operative energization of the switching relay. In the case of applications involving several different frequencies/second, the value of one unit would be based on the lower frequency. Due to some expected variation in voltage and current wave form in typical load circuits, and to still other variables, the value of "one unit" as used herein would be considered large enough to include a normal working margin. Thus, with the variables favorable, the value of "one unit" would be a little larger than the point of threshold response. In any sensitive system, it is possible, without altering general design values, to modify the threshold point of relay response to some extent by altering the original factory adjustment of the switching relay, which would tend to indicate that it may be difficult to locate a sharply defined point of threshold response. With respect to the present system, however, easing up on the relay adjustment provides only very moderate lowering of the response point, whereas the reverse adjustment (to improve switching contact spacing and pressure) cannot be carried very far. Because of the nature of the system of the present invention, the relay tends not to be energizable at all if it is not energizable around the minimum range of primary current. The "maximum" primary current will be considered that which is safely carried for a continuous or sustained period without damaging the system.

Figure 1 illustrates an A.-C. relay 10 which may be a small inexpensive relay requiring suitably little energization power but having adequate contacts for control switching. This relay has an operating coil 11, and the usual magnetic circuit including core 12, frame 13, and armature 14 biased to the open position by spring 15. A copper shading coil 18 avoids or reduces armature chatter, in the usual manner, and is shown more clearly in Figure 2. Particularly when a rectifier is not used in the apparatus, core 12 should be of laminated or equivalent construction, and with a shading coil. Normally-closed contacts 16 and normally-open contacts 17 are shown.

Figure 3 illustrates a preferred embodiment of the present invention, comprising a special transformer 20 and relay 10, all shown in top view as mounted on an insulating base 28. Figure 4 illustrates an enlarged cross-sectional view taken on line IV—IV of Figure 3, showing the small transformer supported by its terminal leads. Core 21 is tape-wound and thus of gapless construction, and consists of grain-oriented metal. Insulation (core box) 22 encloses core 21, and most of the available core circumference is utilized by a hand-wound coarse primary winding 23 which is a single layer winding. The winding may be in two sections requiring four terminal posts 24, these terminals providing amply rigid support of the transformer.

There have been numerous complicated schemes and designs in the attempt to provide apparatus sensitive to use of widely varying power circuit current. Contrarily, the present invention provides a very simple means for achieving this end. Core 21 and winding 23 provide a neat small element and they represent an element affording an approach to pure inductance, relative to the operating conditions of the structure as a whole.

Secondary winding 25 is shown as carried on a narrow bobbin 27, and, as so arranged, interferes to the least extent with the cooling of winding 23. It is not required that the secondary winding be located as shown, but there is no apparent adverse effect from the lack of close linkage between windings. The particular bobbin arrangement is more fully described in co-pending application Serial No. 620,742, filed on November 6, 1956, by William E. McFarland.

In the practice of the present invention, core 21 and primary 23 together are to represent an element of relatively pure inductance with regard to the small primary current herein designated as one unit. Stated in another way, core 21 must be magnetizable to, say, not less than 75% of its basic saturation through effect of not more than about 40% of the ampere turns available from one unit of primary current. The basic saturation would be considered that degree of saturation which excludes only the very slow terminal saturation, thus placing the basic saturation of silicon iron around 15,000 to 16,000 gausses. In other words, the term "basic saturation" would exclude all saturation beyond point C' of Curve C of Figure 7. The attainment of a reasonable approach to pure inductance is greatly hindered by the inherent requirement that winding 23 must have the ability to carry a large current, but a favorable factor is that the core magnetization curve will be reasonably similar to a sinusoidal form when operating with one unit of current. It is found that the grain-oriented tape-wound type of core permits achievement of the needed element of relatively pure inductance, and within practical proportions, and of easy manufacture, and particularly permits a winding that is adequately cooled.

While the grain-oriented tape-wound core does permit a practical structure, it has been found that the needed structure is unattainable in a practical manner, with any material, if the core comprises butted laminations, and also is unattainable even with a true gapless core construction if only the ordinary grade of core material is used. A difficulty is that the needed number of primary turns for the purposes herein cannot be provided. The transformer herein inherently is a small one, and even when using the specified grain-oriented cores, it is necessary to restrict core section as far as possible. This restriction makes for a rather large number of primary turns, but, in compensation, the rather slender core accommodates a good number of turns per unit of mean core length. Beyond a point, however, the core would become impractically slender considering the process of winding the increased number of turns, and the core qualities might be damaged by strains imposed by the winding. It may appear that it would be possible to obtain a larger number of turns per unit of core length by resorting to a multiple layer winding, that is, a winding of several layers in which each layer is series-connected to the under layer rather than being a parallel layer merely to increase the mass of copper without increasing the number of turns established by the basic layer. A multiple layer winding would require the wire size to be larger than otherwise particularly since insulation between layers would interfere with cooling, and the winding of a very large number of turns about a very small core would present an impossible winding problem. In the present invention, therefore, the core material must exhibit performance characteristics within certain limits, and the primary winding typically is a single layer winding.

There are a few expensive core materials available in tape or strip or other gapless form, such as some types sold under the trade name "Permalloy," which exhibit their maximum permeability only in the intermediate magnetization range, and yet their quality is so high that they may be magnetized about to a level of basic saturation by nominal magnetizing force. Thus, these particular materials will meet the physical requirements of the present application as to permeability, but due to cost considerations, they tend to prove impractical and most of them are made still less practical because they are saturated at relatively low density. The requisite for the present application is only that permeability be high relative to high magnetic induction, and the materials presently available at practical cost are those having the relatively rectangular hysteresis loops and exhibiting a maximum permeability that is high compared with average transformer core material but less than the maximum permeability reached by the very sensitive materials. In addition, the rectangularity of the loop (low permeability at low induction) can be utilized in a manner which is equivalent to increasing the performance of the metal.

There are at present two principal commercial grades of high permeability tape or strip of this kind. Typical D.-C. hysteresis loops thereof are shown by the chart of Figure 7. Curve A illustrates the normal full loop of a 50% nickel-iron grain-oriented tape-wound material, while curve B illustrates the approximate loop respective to low flux density and shows that this type of material is not significantly responsive until the magnetizing force is a large fraction of that capable of saturating the material. Curve C illustrates the loop of the standard high permeability grade of grain-oriented silicon-iron as furnished for tape-wound cores. This latter material has a more modified rectangular loop. The 60 cycle A.-C. dynamic loops of either material would be wider, but only mildly so where the magnetization rate is moderate.

Curve A shows basic saturation occurring sharply at about 14,000 gausses. Final or terminal saturation usually is given as 15,500 gausses, the latter requiring high force and being of little significance in the practice of this invention. The need to establish "one unit of primary current" at some certain small value is dictated in a large part by the demands of individual applications. This value, however, must be established large enough so that core magnetization is readily achieved with the available primary turns. The nickel-iron material permits a very low value representing one unit, relative to the maximum sustained current, it being obvious that the ratio between minimum and maximum more nearly indicates the problems of a particular application, rather than where the actual maximum value may fall.

Curve C does not reach the basic saturation point (15,000 to 16,000 gausses) with the same complete abruptness as curve A, but permeability remains near its highest to, say, near 12,000 gausses which should be considered approximate saturation for this material. Above basic saturation, there is a slow climb to final or terminal saturation usually given as 20,000 gausses.

While numeral 20 of Figure 3 illustrates the conventional arrangement wherein there is an electrically isolated secondary winding, this winding (as a distinctly separate element) is not an essential for every application for which the structure may be employed. Thus, the separate secondary winding may be unused or omitted entirely leaving the primary winding to serve both purposes in which case transformer 20 can function as an autotransformer of unity turn ratio although structurally it would represent simply an inductor since there is no sharp distinction between a simple inductor and an autotransformer as the primary-to-secondary ratio approaches unity. Usually, there will be a need for a step-up ratio even with the autotransformer arrangement, and some need also to isolate the secondary winding, but explanation is simplified by utilizing transformer 20 as an autotransformer of unity ratio. Figure 5, therefore, shows a circuit arrangement including a typical power circuit but with the conventional secondary winding 25 unused.

Numeral 30 represents the common 60 cycle/second power source, say 115 volt, with circuit wires 31 connecting the source with loads 33 controlled by switches 34. Numeral 32 illustrates a residual resistance or impedance of the load circuit such as a leakage which may unavoidably occur as due to small control devices, clocks, etc. or which may deliberately be provided to assure a small residual current flow in the load circuit when all the regular connectable-disconnectable loads 33 are disconnected. The residual current must be somewhat smaller than the value of one unit of primary current as herein defined. In many instances there will be no residual current.

For the example illustrated in Figure 5, one load 33, together with the residual flow, may draw no more than "one unit" of current, while a combination of loads may draw the maximum current for which winding 23 is properly rated. Relay coil 11 is connected across winding 23 for operative energization of relay 10 when the power circuit is put into use by the connection of any load. Design values are to be selected as described hereinafter to provide for the sensitive response and at the same time provide for uniformity of relay operation as made possible by the structure.

Now, assuming a 60 cycle/second load circuit and the need for response to occur at 0.25 ampere while maximum sustained current is to be 25 amperes, it will be necessary to establish 0.25 ampere as the value of "one unit" of primary current. This represents a working range or sensitivity ratio of 100 to 1, and would be considered a difficult objective to meet in a practical manner with present prior art equipment. Core 21 should be the grain-oriented nickel-iron grade or at least its equal, and the practical proportions of the core dimensions would be met by utilizing a core sectional area of, say, 0.73 cm.² carrying 40 turns of #12 wire, or even somewhat smaller. The mean core circumference or length need not be more than about 5". On the aforesaid basis, winding 23 can be considered roughly a 1 volt winding as working just about to 14,000 gausses core saturation. Curve A in Figure 7 shows 0.1 oersted as the magnetizing force required. Converting the latter to ampere turns, and allowing for, say 5" core length, one ampere turn will operate the core through the D.-C. hysteresis loop A, while, say, two ampere turns will carry this core to saturation through an A.-C. hysteresis loop (not shown). This is a suitably small requirement relative to 0.25 ampere power circuit current when using 40 turns of primary winding 23.

The idealized condition with respect to Figure 5 would be that when just one unit of primary current flows, all of this power circuit current flows through relay coil 11, and also, relay 10 is energizable by a very small voltage drop compared to the power circuit voltage. An ideal condition with respect to two units of primary current would be one in which exactly half the power circuit current flows through relay coil 11, but the current through the coil is unchanged in wave form, so that relay 10 is energized identically with two units of primary current as with one, with similar compensation for all still higher values of primary current.

The present structure provides a very close approximation of the idealized conditions in that for some unknown reason relay pull-in force is practically independent of initial primary current. Relay hold-in also is practically independent, and the adverse effect on power circuit regulation remains at a desirably small uniform level. It will be apparent (since winding 23 is suggested as a 1 volt winding) that if relay coil 11 represented pure resistance and transformer or inductor 20 represented pure inductance up to its saturation, a 4 ohm value of coil 11 would permit optimum power of roughly 250 milliwatts for coil 11 as the entire 0.25 ampere current would pass through coil 11. Doubling the value of primary current to 0.50 ampere would split each half-cycle into equal periods with all the power circuit current passing through winding 23 in the last period. Peak voltage would reach twice the original height with power consumed in coil 11 having been doubled by doubling the power circuit current. Further doubling and redoubling of power circuit current would have less effect.

Transformer 20 is so nearly an element of pure inductance that it will not leak or by-pass any very significant current up to its saturation, and by placing the impedance of coil 11 just moderately above 4 ohms, core saturation will be reached (even as of the open position of the relay armature) but not necessarily exceeded, while carrying 1 unit of primary current. At 2 units of primary current, primary winding 23 will by-pass half or more of the power circuit current respective to coil 11, according to whether or not the impedance match was made for rather early saturation relative to the 1 unit of primary current.

Considering that element 20 is less than perfect and winding 23, therefore, must by-pass some current, relay 10 must be one that is energized with say 200 millivolt-amperes and more than barely energized, to allow for variables. The D.-C. resistance of coil 11 in this example will be much less than 4 ohms and the coil energy will be much less than 200 milliwatts. Considering the effect of closing the relay armature and other variables, the increase of actual coil energy (with increase of primary current) is not readily calculated, but coil heating is of no apparent significance.

Assuming that relay 20 requires an energization of nearly 200 millivolt-amperes to make it operable, it will not be operable unless the impedance match is in the range to assure saturation of core 21 and there necessarily will have to be an optimum impedance match in that relay energization should be just about only possible with the theoretical power available. It is, however, possible within slight limits, to "overmatch" in the direction of early saturation of core 21, which, if carried far, would make the response critically affected by any adverse variables. The D.-C. resistance of coil 11 for the above example may be properly as low as, say, one ohm when considering small switching relays of average characteristics whose coils usually are wound with less than two ounces of copper wire.

It has been made clear that the needed energization of relay 10 is accomplished with an inductor element near the theoretical limit of small size as to the number of its turns relative to its core section, and the adverse effect on power circuit regulation is, therefore, relatively negligible. This simple compact transformer does not heat excessively and avoids much of the cumulative temperature rise often associated with current-actuated devices. It will be noted that there is no auxiliary provision or expedient to modify the energization of relay 10, but it is most fortunate that the physical behavior and coil temperature rise of the relay are almost as level as in the idealized example given, and this holds good through the entire range of power circuit current and relative to both the pull-in and hold-in conditions. As of the maximum power circuit current flow, practically all of the power circuit current is by-passed relative to relay coil 11 except for a very brief pulse of flow through coil 11 in the early part of each half cycle. Flux in the relay magnetic circuit, however, reaches a sufficient value that there is an adequate local flow of decay current, and thus relay armature 14 is held down with the desired force and effect until the next pulse occurs.

In Figure 6, relay coil 11 is shown energized by its connection with secondary winding 25. There is no basic preference whether transformer 20 is arranged as an auto transformer of unity or other ratio, or as in Figure 6, in that the structure functions to by-pass the relay coil in an equivalent manner in each case. There necessarily is some change of working relationship when the secondary winding is located in one segment of the transformer circumference as shown by Figure 3, but operation is excellent in spite of the radical design.

Values for conditions may be assumed as for Figure 5, e.g., the 0.25 ampere value of one unit of primary current, 25 amperes maximum, and primary winding 23 being a 1 volt winding as described. Relay 10 would, therefore, again be one properly energizable by about 200 millivolt-amperes, and its coil may be wound with any convenient size of wire, and, for example, if this results in a coil having 50 ohms D.-C. resistance, it may require, say 250 turns of secondary to obtain the same impedance match as in Figure 5, namely, that assuring a saturation of core 21 together with an optimum relay response. The quality of relay response will be the same as in Figures 5 and 6.

Figure 8 illustrates the oscilloscope trace of the transformer secondary current in relation to different values of primary current and thus shows wave patterns under varying conditions through relay coil 11. These curves are based on the design values given for Figure 6. Broken line curve A reflects the current flow with respect to time with one unit of primary current (0.25 ampere) when the relay armature is forcibly maintained in open position, while curve B reflects the current flow after pull-in of the relay. Curves C, D, and E illustrate that the amount of secondary current flow remains nearly uniform with two, four and even forty units of primary current, respectively. Referring to curve E for forty units of primary current, the peak current flow through the relay coil is too brief to have a serious heating effect, while decay current is nearly as well sustained (during the latter portion of the half-cycle) as in the case of smaller primary current, such as in curve D.

The preceding examples and the curves of Figure 8 are based upon a constant 60 c.p.s. frequency, and it will be clear from Figure 8 and other data given that the energization of relay 10 reaches, say, only about a volt-ampere at maximum. It is well-known that even small switching relays will stand several volt-amperes of energization. Thus, it would be possible to raise significantly the frequency of the power circuits of either Figure 5 or 6, and relay coil 11 still would not be overheated above its proper limit. There are instances where a control system of the present type is required to respond to an initial frequency that is considerably lower than the running frequency. A particular example is that of a control system for effecting slow idling of an engine-generator set, in which the low frequency usually would be of the order of 20 to 30 c.p.s. while the corresponding running frequency would be 60 c.p.s. It will be obvious also that it is necessary to establish "one unit" of primary current on the basis of the lower frequency, and that it is not possible to establish this value as low as it could be established were only one frequency involved. The present structure, however, readily meets the difficulties presented by variable frequencies.

The examples and design data given relative to Figures 3 to 8 serve to illustrate typical normal design values and operation if minimum primary current is required to be 0.25 ampere, and maximum to be 25 amperes, and where a switching relay energizable within 200 millivolt-amperes is adequate for control. It will be obvious that design values may be varied, within reasonable limits, to meet varied specifications. For example, provision for 50 amperes maximum primary current would require paralleling of primary turns or use of larger wire, possibly stranded wire, and would also tend to require an upward revision of the value of one unit of primary current above 0.25 ampere. As another example, relay 10 could be of a type requiring 400 millivolt-ampere energization, with the disadvantage either that the value of one unit would have to be revised larger or transformer 20 made larger.

Figure 7 indicates that the silicon-iron type of core requires from six to ten times the magnetizing force which brings the nickel-iron core to saturation, and even so, the silicon-iron core would not be saturated to quite the same flux density. In practice, the distinction is not this severe, since the curves of Figure 7 are D.-C. curves. Also, residual flow in the power circuit permissibly may be a little larger (when using the silicon-iron core) without causing sticking tendency of the relay. The silicon-iron core thus often will provide the performance needed for the practice of the invention, especially where the ratio between maximum and minimum primary current is much less than 100 to 1. It is impossible for the silicon-iron core to become utilized entirely to its basic saturation level (point C') while operating with only one unit of primary current, considering that apparatus of the present nature normally will be expected to have a sensitivity ratio of ten to 1 or greater. Relay coil heat (using economical silicon-iron transformer cores) thus will not be quite as level as when using the more permeable nickel-iron cores. However, most ordinary relays have a reserve of heat dissipation capacity.

An extremely important advantage of the present structure is that a metallic rectifier may be added with significant benefit. It is well known that these rectifiers are not suited to provide good performance and efficiency where an extreme variation of current and voltage are encountered. The current transformer employed herein is one which minimizes the limits of variation and permits a degree of rectifier efficiency so that an improvement in relay operation and switching capacity can be obtained.

Figure 9 illustrates one circuit arrangement including a metallic rectifier 40. Shading coil 18 is omitted from relay 10'. Also, in this case, core 11 permissibly may be solid rather than laminated. Transformer size estimate and other factors are determined in the same general manner as for the Figure 5 or 6 circuits, but some degree of trial and error may be necessary to obtain good rectifier efficiency consistent with safely low rectifier cell operating temperature. The available transformer output, when carrying one unit of primary current, necessarily will have to be large enough to cover relay energization as well as rectifier energy loss.

Assuming relay 10' to be of the same general size and quality as was described for use in Figures 5 and 6 (wherein it was assumed that approximately 200 millivolt-ampere energization was required), the energization requirement for the system of Figure 9 would be less, say even 100 millivolt-amperes. This would tend to permit one unit of primary current to be established at a very low value, or, alternately, reduction in the suggested size of transformer 10', but it may be assumed that rugged relay operation is preferred and that relay 10' is now adjusted for better contact clearance and pressure and still will require an estimated 200 millivolt-ampere energization. The values of 0.25 ampere as one unit of primary current and 25 amperes maximum primary current may therefore remain as given for Figures 5 and 6, and the transformer size assumed to be the same, e.g., with 40 primary turns and 0.73 cm.$^2$ core section. The correctness of the 200 millivolt-ampere estimate for relay energization is, however, dependent upon avoiding extreme rectifier loss. Thus, there must be a sufficient number of turns of secondary winding 25 so that the transformer output voltage is suitable for rectification. Considering the faults of available practical rectifiers, there tends to be a rather sharp limit on the maximum number of secondary turns employed. Therefore, the secondary turns are rather fixed by circumstances which, in turn, dictate the wire size used for winding relay coil 11 so as to obtain a proper impedance match.

For the values already given, and assuming rectifier 40 is of the selenium type with a rating of 63 volts peak inverse voltage and with its cells, say being 1.25" square and the rectifier rated for 300 milliampere current, secondary winding 25 safely may have 250 turns, and the D.-C. resistance of coil 11 would be about 150 ohms, more or less, according to the exact details of the relay. The actual relay energization current will be very much smaller than 300 milliamperes, but, as one factor, the over-size rectifier serves to lessen rectifier loss.

As in the case of the Figure 5 and 6 circuits, relay energization is extremely uniform with no significant heating of coil 11. With an optimum impedance match, relay 10' will pull-in at the proper value of primary current, established as being one unit, and transformer core 21 will be magnetized to saturation each half-cycle, as before.

The suggested 250 turns of secondary winding would provide transformer output of say 6 to 7 volts, while carrying one unit of primary current. Rectifier drop would not greatly exceed one volt, thus holding rectifier loss moderate in relation to rectifier benefits. However, the above example of rectifier loss is based upon a power circuit with constant 60 cycle frequency. If there is a low frequency condition in addition to the regular running frequency, it becomes necessary to revise all design values in accordance with the low frequency. The rectifier presents a special problem in this case, as the permissible limit of transformer secondary turns tend to be too low a number (thus, with too low a transformer output voltage when operating with low frequency) for good rectification. The adverse condition can be modified considerably by using a grade and size of rectifier cells permitting the largest number of turns, and by using a relay having a small energization requirement.

The present structure, when including a rectifier, permits a rather heavy duty switching relay to be substituted for the small control relay 10' of Figure 9, provided the ratio of maximum to minimum primary current is moderate, whereas heavy duty relays are hardly practical at all in a sensitive system of the present type if rectification is omitted.

Figure 10 illustrates a typical heavy duty relay or contactor 50, such as one having, say, a 15 or 20 ampere switch rating. This relay has a base 57, coil 51, core 52 which could be non-laminated, also a frame 53 and an armature 54 normally held open by spring 55, and the relay will have contacts 56, as needed.

The energization requirement, including rectifier loss, may be, say 1.5 volt-amperes. If transformer size is assumed as suggested for the other figures, e.g., with a 1 volt primary winding, it will be practical to establish the value of one unit of primary current around 2 amperes or a little less and yet assure pull-in, and the grain-oriented silicon-iron type of core would be suitable. Assuming that maximum primary current is 25 amperes, the range from minimum to maximum is moderate, which tends to allow good rectifier efficiency by permitting more turns of transformer secondary winding than otherwise. About 250 turns may be conservative when using a selenium rectifier rated for 63 volts peak inverse voltage, and the rectifier should be oversize respective to the forward current, thus being rated for, say 600 milliamperes or more. For the given values, the proper impedance match will be obtained by a value of 30 ohms, more or less, for coil 51. It obviously is necessary to increase the mass of secondary winding 25 when energizing a larger type relay but the space requirement of the winding remains within practical limits and winding 25 still may be placed conveniently on a bobbin.

It will be apparent that rather large relays would not be practical for the present apparatus if it were not possible to maintain a suitably uniform transformer output. The reason for this is because there is less reserve coil dissipation capacity, than in the small relays. However, the novel structure as described herein has been found to readily hold coil heating within the normal rating limits. The operation of rather large relays furthermore is very smooth and uniform with the system of the present invention.

The problem of using rectifiers generally in apparatus of the present type has been hereinbefore mentioned. The particular structure herein reduces the problem greatly in that the transformer is inherently a small one and the relay energization current is quite level. Rectifier cells of suitably small rating and price may fortunately be oversize relative to the maximum forward current, making heating effect from forward current very minor, and releasing most of the capacity of the cell for the dissipation of the heat of reverse current.

While the current output of transformer 20 is quite level, the peak voltage rises somewhat in proportion to rise of primary current, especially in the lower range. Even as of one unit of primary current the voltage wave form tends to be slightly peaked rather than sinusoidal, and for higher values of primary current, the impedance of relay coil 11 or 51 is such that transformer 20 is operating relatively without load, and core 21 saturates quickly with production of a high instantaneous voltage. The height of the peak voltage necessarily is limited by the loading effect of rectifier leakage. Practical size rectifier cells however can dissipate only a limited amount of heat. In addition, the secondary winding of the transformer described herein is one with small capacity, and thus rectifier leakage must be held within a proper limit by so restricting the transformer secondary turns that rectifier leakage does not significantly appear until primary current is well above the minimum. Thus, the design voltage of secondary winding 25 is to be a moderate fraction of the voltage rating of the rectifier used. In the latter case, primary current will have to reach a value of several units before instantaneous peak voltage reaches the peak reverse voltage rating of the rectifier and there will be little actual leakage heat at this point because the voltage pulses will have become noticeably brief. The reverse resistance of rectifiers is in inverse ratio to applied voltage, placing a rather definite limit on the peak voltage induced by transformer 20.

Since core 21 of the transformer saturates almost instantly through the effect of very large primary current flow, it can be considered to be operating well beyond saturation. The design voltage of the secondary must be sufficiently high to permit adequate functioning of the rectifier even at operating conditions of the one unit of power circuit current flow, yet, it should be a sufficiently low voltage so that large rectifier leakage currents could occur only when the core is operated well beyond saturation.

Most metallic rectifier cells have a somewhat similar forward voltage drop which is below 1 volt for a low current density, and there are cells now available (of the silicon type) rated for much higher reverse voltage (respective to forward drop) than the common selenium cells. However, the leakage permitted by selenium cells is sufficiently moderate for the reason that reverse resistance does not deteriorate under the combined effects of reverse voltage and cell temperature near the safe limits. Temperature limitations of some types of good metallic rectifiers make them unsuited for the structure herein.

This application is a continuation-in-part of copending applications Serial No. 556,277, filed on December 29, 1955, and Serial No. 589,467, filed on June 5, 1956, by William E. McFarland, now both abandoned.

I claim:

1. In a current-actuated sensing apparatus employed in a power circuit in which the current flowing varies in range from a minimum flow of one unit to a sustained maximum flow of current much greater in value than one unit, said apparatus including a transformer having a core and an electromagnetic switching relay having an operating coil, and connected thereto and energizable thereby to operate an off-on control circuit in response to the flow or non-flow of current in the power circuit, the improvement wherein the transformer is only of size such that its theoretical output, when its primary winding is carrying only said one unit of current while said core is operated in a high saturation range, does not exceed appreciably the energization requirement to make operable said relay, said transformer having a small-size gapless tape-wound core of grain-oriented material having permeability at least equal to that of grain-oriented silicon iron, said core carrying a primary winding consisting of a single layer of coarse wire, there being a relationship between the number of turns of primary winding, the length of the core and its permeability such that said core is readily magnetizable very close to its basic saturation level and through the effect of not over about 40% of the primary ampere turns when carrying said one unit of current, said relay being impedance-matched to said transformer in a manner so that said core reaches a value close to its saturation level when the primary carries said one unit of current, the impedance match being near the optimum match for obtaining the operative energization of said relay.

2. A current actuated sensing apparatus according to claim 1 in which the transformer is connected to a small electromagnetic switching relay having a laminated core and a shading coil.

3. A current actuated sensing apparatus according to claim 1 in which the transformer has a toroidal tape-wound core and a secondary of small mass electrically isolated from the primary, said secondary being concentrated on a small portion of the core length.

4. A current actuated sensing apparatus according to claim 1 in which the transformer has a secondary of small mass, and a metallic rectifier connected to said secondary and to the coil of said relay for unipolar energization thereof.

5. A current actuated sensing apparatus according to claim 4 in which the design voltage of said secondary is a sufficiently high voltage to permit adequate functioning of said rectifier even at operating conditions of said one unit of power circuit current flow, yet being a sufficiently low voltage so that large rectifier leakage currents could occur only when the core is operated well beyond saturation through the effect of very large primary current flow.

6. A transformer for use in a current-actuated sensing apparatus employed in a power circuit in which the current flowing varies in range from a minimum flow of one unit to a sustained maximum flow of current much greater in value than one unit, said apparatus also including an electromagnetic switching relay impedance matched to the transformer in a manner so that said hereinafter-mentioned core is magnetized close to its saturation level when the hereinafter-mentioned primary carries said one unit of current, said impedance match also being near the optimum match for obtaining the operation of said relay when carrying one unit of current, the latter relay having an operating coil connected to said transformer and energizable thereby to operate an off-on control circuit in response to the flow or non-flow of current in the power circuit, said transformer being only of sufficient size that its theoretical output, when its primary winding is carrying only said one unit of current and while operating in a high saturation range, does not exceed appreciably the energization requirement to make said relay operable, and having a small size gapless tape-wound core of grain-oriented material having permeability at least equal to that of grain-oriented silicon iron, said core carrying a primary winding consisting of a coarse winding and having only a single layer of wire and having a permeability such that said core is readily magnetizable very close to its basic saturation level and through the effect of not over about 40% of the primary ampere turns when carrying said one unit of current, said core also carrying a secondary winding of small mass and electrically isolated from said primary and being concentrated on a small portion of the core length.

7. A transformer according to claim 6 having its said secondary winding designed to be connected to a metallic rectifier and to the coil of said relay for unipolar energization thereof and having its said secondary winding designed voltage sufficiently high to permit adequate functioning of said rectifier even at operating conditions of said one unit of power circuit current flow, yet being a sufficient low voltage so that large rectifier leakage currents could occur only when said core is operated well beyond saturation through the effect of very large current flow through said primary winding.

References Cited in the file of this patent

UNITED STATES PATENTS

| | | |
|---|---|---|
| 1,204,507 | Smith | Nov. 14, 1916 |
| 1,540,307 | Beall | June 2, 1925 |
| 2,415,189 | Pell | Feb. 4, 1947 |
| 2,468,634 | Lexa | Apr. 26, 1949 |
| 2,810,840 | McFarland | Oct. 22, 1957 |